United States Patent
Graham et al.

(10) Patent No.: US 10,232,469 B2
(45) Date of Patent: Mar. 19, 2019

(54) SYSTEM AND METHOD FOR MANUFACTURING COMPONENT

(71) Applicant: Caterpillar Inc., Peoria, IL (US)

(72) Inventors: Curtis J. Graham, Peoria, IL (US); Daniel T. Cavanaugh, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 109 days.

(21) Appl. No.: 15/282,031

(22) Filed: Sep. 30, 2016

(65) Prior Publication Data
US 2018/0093349 A1   Apr. 5, 2018

(51) Int. Cl.
*B23K 26/34* (2014.01)
*B23K 26/342* (2014.01)
*B23K 35/02* (2006.01)
*B23K 9/04* (2006.01)
*B23K 9/173* (2006.01)
*B23K 26/00* (2014.01)
*B23K 101/00* (2006.01)
*B23K 103/18* (2006.01)

(52) U.S. Cl.
CPC ........... *B23K 26/342* (2015.10); *B23K 9/046* (2013.01); *B23K 9/173* (2013.01); *B23K 26/0006* (2013.01); *B23K 35/0244* (2013.01); *B23K 2101/006* (2018.08); *B23K 2103/26* (2018.08)

(58) Field of Classification Search
CPC .............. B23K 26/144; B23K 20/1228; B23K 10/027; B23K 26/0066; B23K 26/34–26/342
See application file for complete search history.

(56) References Cited

U.S. PATENT DOCUMENTS

| | | | | |
|---|---|---|---|---|
| 6,420,677 B1 * | 7/2002 | Emer | ..................... | B23K 26/40 219/121.67 |
| 7,112,301 B2 | 9/2006 | Thorne et al. | | |
| 2006/0248718 A1 | 11/2006 | Szela et al. | | |
| 2010/0257733 A1 * | 10/2010 | Guo | ....................... | B23K 26/18 29/889.1 |
| 2012/0110847 A1 * | 5/2012 | Berkebile | ............ | B23K 1/0056 29/889.1 |
| 2013/0104397 A1 * | 5/2013 | Bunker | ................... | B23P 6/007 29/889.1 |
| 2013/0227951 A1 * | 9/2013 | Krichever | .............. | B23K 9/048 60/737 |
| 2015/0037498 A1 | 2/2015 | Bruck et al. | | |
| 2015/0113993 A1 * | 4/2015 | Rudrapatna | ............... | F23R 3/14 60/748 |
| 2016/0184891 A1 * | 6/2016 | Mironets | ............... | B22F 1/0096 419/53 |
| 2017/0057014 A1 * | 3/2017 | Illston | .................... | B33Y 10/00 |
| 2017/0328225 A1 * | 11/2017 | Mottin | .............. | B23K 20/1205 |
| 2017/0368647 A1 * | 12/2017 | Bunker | .................. | B23K 26/34 |
| 2018/0141127 A1 * | 5/2018 | Richard | ................. | B33Y 10/00 |

* cited by examiner

*Primary Examiner* — Michael Laflame, Jr.

(57) ABSTRACT

A method of manufacturing a component is disclosed. The method includes depositing a material on a removable form structure having geometry corresponding to an internal space of the component. The material is deposited on the removable form structure by an additive manufacturing technique. The method includes removing the removable form structure to obtain a pre-machined component, and then machining the pre-machined component to manufacture the component having the internal space.

12 Claims, 10 Drawing Sheets

SYSTEM AND METHOD FOR MANUFACTURING COMPONENT

TECHNICAL FIELD

The present disclosure relates to manufacturing techniques, and more particularly relates to a component having an internal space and methods for manufacturing the component having the internal space.

BACKGROUND

Components that are made of super-alloys, such as Inconel, are generally made by starting with a solid bar or a block of raw material. The block or bar is then machined to obtain a final component. Manufacturing of the final component by using such techniques involves wastage of a significant amount of the raw material. In some cases, 50% or more of the raw material may get wasted during the manufacturing. Owing to high cost of super-alloys, an overall cost of the manufacturing of the final component becomes significantly high. Further, handling of the wasted material also poses inconvenience with regard to cleaning and disposal. Moreover, the handling would in turn add to the overall cost of manufacturing of the final component.

U.S. Publication No. 2006/0248718 (hereinafter the '718 publication), shows a method for forming or remanufacturing a component to have an internal space. A refractory metal blocking element is positioned with at least a portion to be within the internal space. A material is added by at least one of laser cladding and diffusion brazing, the blocking element at least partially blocking entry of the material to the internal space. The blocking element is removed. The method disclosed by the '718 publication includes an expensive blocking element, and poses inconvenience with regard to removal of the blocking element.

SUMMARY OF THE DISCLOSURE

In one embodiment of the present disclosure, a method of manufacturing a component is provided. The method includes depositing a material on a removable form structure having geometry corresponding to an internal space of the component. The material is deposited on the removable form structure by an additive manufacturing technique. The method includes removing the removable form structure to obtain a pre-machined component. The method further includes machining the pre-machined component to manufacture the component having the internal space.

In another embodiment of the present disclosure, a method of manufacturing a component is provided. The method includes producing a removable form structure with geometry corresponding to an internal space of the component. The method includes depositing a material on the removable form structure. The material is deposited by an additive manufacturing technique. The method further includes removing the removable form structure to obtain the component having the internal space.

In yet another embodiment of the present disclosure, a component includes an outer surface and an inner surface distal to the outer surface. The outer surface defines an internal space. The internal space is formed by removing a removable form structure in contact with the inner surface before the removal.

Other features and embodiments of this disclosure will be apparent from the following description and the accompanying drawings.

DETAILED DESCRIPTION

Wherever possible, the same reference numbers will be used throughout the drawings to refer to the same or the like parts. The present disclosure provides methods for manufacturing a component having an internal space by using a removable form structure, and the component manufactured by such methods. A super-alloy material may be deposited on the removable form structure having geometry corresponding to geometry of the internal space. Upon deposition of the super-alloy material, the removable form structure may be removed by vaporization or a mechanical removal technique, forming the component.

Figure 1:
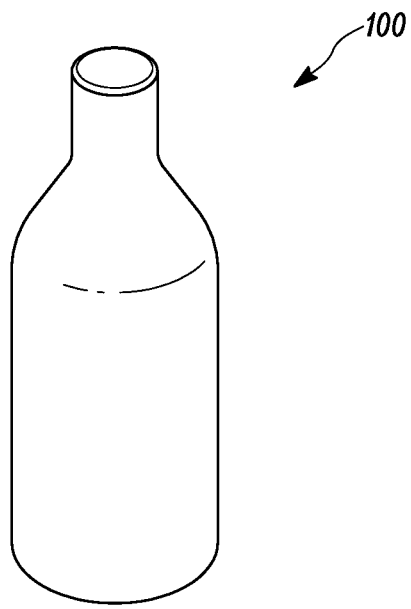
FIG. 1 is a perspective view of a removable form structure, according to one or more embodiments of the present disclosure.

FIG. 1 illustrates a perspective view of a removable form structure 100 for manufacturing a component (shown in FIG. 4) having an internal space, according to one or more embodiments of the present disclosure. The removable form structure 100 may have geometry corresponding to the internal space of the component. In particular, the geometry of the removable form structure 100 may compliment geometry of the internal space such that upon removal of the removable form structure 100, a desired geometry of the internal space may be achieved. Therefore, a shape and dimensions of the removable form structure 100 may vary based on a shape and dimensions of the internal space.

The removable form structure 100 may be made of a material that can either be conveniently vaporized or mechanically removed. In one embodiment, the removable form structure 100 may be one of a graphite form structure, a carbon form structure, a ceramic form structure, and a tungsten form structure.

Figure 2:
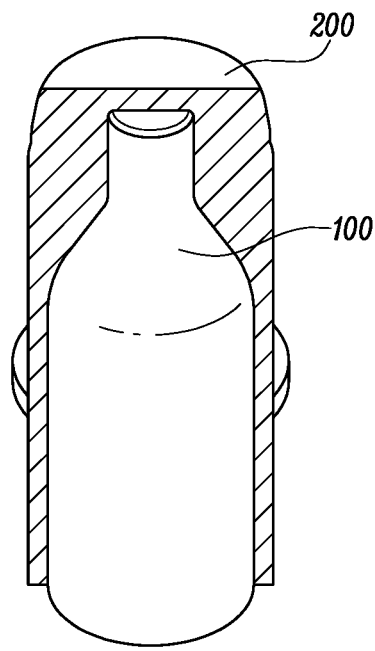
FIG. 2 is a perspective view of the removable form structure with a material deposited by using an additive manufacturing technique, according to one or more embodiments of the present disclosure.

FIG. 2 illustrates a perspective view of the removable form structure 100 with a material 200 deposited by using an additive manufacturing technique, according to one or more embodiments of the present disclosure. In one embodiment, the material of the removable form structure 100 may be selected based on mixing capabilities with the material 200. For example, the removable form structure 100 may be made of a material that does not mix with the material 200 during deposition. Further, the material 200 may be deposited on the removable form structure 100 based on geometry of the component to be manufactured.

In one embodiment, the material 200 to be deposited on the removable form structure 100 may be a super-alloy material. The material 200 may include, but is not limited to, Inconel. In another embodiment, the material 200 may be a combination of super-alloy materials. In yet another embodiment, the material 200 may be a metal. In one embodiment, the material 200 to be deposited on the removable form structure 100 may be selected based on a melting point. For example, a material 200 having a melting point higher than a combustion temperature of the removable form structure 100 may be selected for deposition. Similarly, in case of the removable form structure 100 being the graphite form structure, the material 200 having a melting point higher than an oxidation temperature of the removable form structure 100 may be selected for deposition.

Further, the material 200 may be deposited on the removable form structure 100 by the additive manufacturing technique. In one embodiment, the additive manufacturing technique may be a laser cladding process. In the laser cladding process, the material 200 may be deposited on the removable form structure 100 using a focused laser beam (not shown). The material 200 may be fed into the focused laser beam, and the focused laser beam may be scanned over the removable form structure 100. On account of the scanning of the focused laser beam, the material 200 may be deposited on the removable form structure 100. In other embodiments, the material 200 may be deposited by using any other additive manufacturing technique known in the art, without departing from the scope of the present disclosure. In one embodiment, the material 200 may be deposited by using a welding technique, for example, by a cold metal transfer welding technique.

Figure 3:
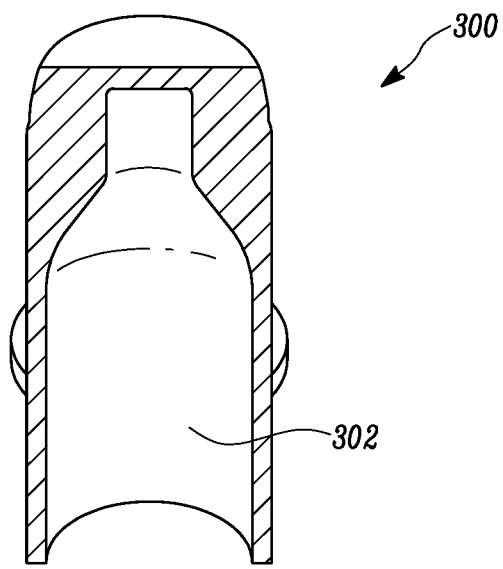
FIG. 3 is a perspective view of a pre-machined component, according to one or more embodiments of the present disclosure.

FIG. 3 illustrates a perspective view of a pre-machined component 300 having a pre-machined internal space 302, according to one or more embodiments of the present disclosure. The pre-machined component 300 having the pre-machined internal space 302 may be obtained after removing the removable form structure 100.

In one embodiment, upon solidification of the material 200, the removable form structure 100 may be removed by vaporization. Therefore, the removable form structure 100 may be burnt to vaporize, forming the pre-machined internal space 302 in the pre-machined component 300. The vaporization of the removable form structure 100 may not affect the material 200 as the melting point of the material 200 may be higher than the combustion temperature or the oxidation temperature of the removable form structure 100.

In another embodiment, the removable form structure 100 may be mechanically removed to form the internal space. For example, the removable form structure 100 may be removed by using tools, such as tongs. Therefore, the removable form structure 100 may be pulled out by using such tools, forming the pre-machined component 300 having the pre-machined internal space 302.

Figure 4:
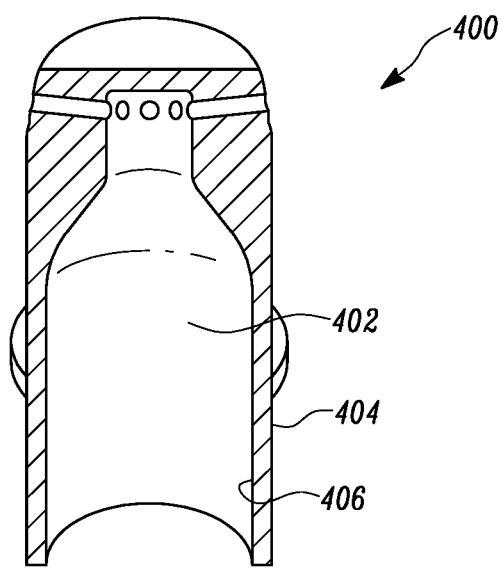
FIG. 4 is a perspective view of a component having an internal space, according to one or more embodiments of the present disclosure.

The pre-machined component 300 may then be machined to obtain the component. FIG. 4 illustrates a perspective view of the component 400 having the internal space 402, according to one or more embodiments of the present disclosure. In the present embodiment, the component 400 may be a pre-chamber (not shown) of a fuel injector (not shown). In other embodiments, the component 400 may be any other component having the internal space, without departing from the scope of the present disclosure.

As shown, the component 400 may include an outer surface 404 and an inner surface 406 distal to the outer surface 404. The inner surface 406 may be defining the internal space 402. After deposition of the material 200 on the removable form structure 100, the inner surface 406 of the material 200 so formed may be in contact with the removable form structure 100. As would be gathered, the internal space 402 may be obtained by removing the removable form structure 100 in contact with the inner surface 406 before the removal.

Figure 5:
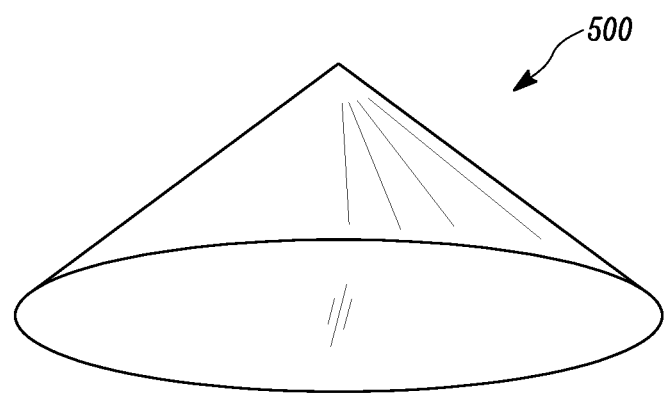
FIG. 5 is a perspective view of a removable form structure, according to one or more embodiments of the present disclosure.

FIG. 5 illustrates a perspective view of a removable form structure 500 for manufacturing a component (shown in FIG. 7), according to one or more embodiments of the present disclosure. In the present embodiment, the removable form structure 500 may be conical in shape with a circular base 502 for forming an internal space (shown in FIG. 7) of the component which is conical in shape. In one embodiment, constructional and operational details of the removable form structure 500 may be similar to constructional and operational details of the removable form structure 100.

Figure 6:
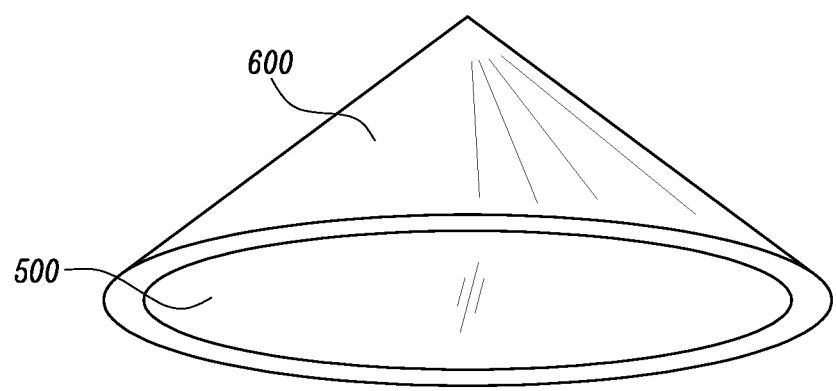
FIG. 6 is a perspective view of the removable form structure with a material deposited by using an additive manufacturing technique, according to one or more embodiments of the present disclosure.

FIG. 6 illustrates a perspective view of the removable form structure 500 with a material 600 deposited by using the additive manufacturing technique, according to one or more embodiments of the present disclosure. In one embodiment, constructional and operational details of the material 600 may be similar to constructional and operational details of the material 200. Upon solidification of the material 600 deposited on the removable form structure 500, the removable form structure 500 may be removed for manufacturing the component.

Figure 7:
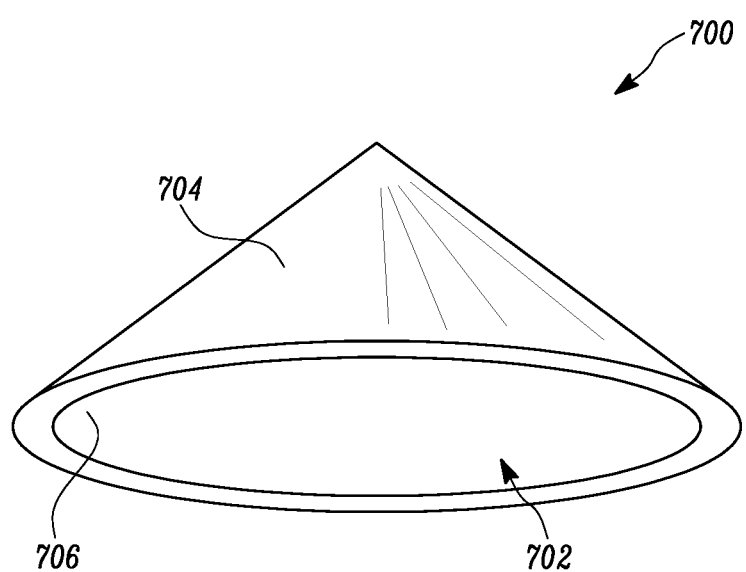
FIG. 7 is a perspective view of a component having an internal space, according to one or more embodiments of the present disclosure.

FIG. 7 illustrates a perspective view of the component 700 having the internal space 702, according to one or more embodiments of the present disclosure. As shown, the component 700 may include an outer surface 704 and an inner surface 706 distal to the outer surface 704. The inner surface 706 may define the internal space 702 which may be formed by removal of the removable form structure 500 in contact with the inner surface 706 before the removal.

In an alternative embodiment, the removable form structure 500 may be removed to form a pre-machined component (not shown) having a pre-machined internal space (not shown) which may then be machined to manufacture the component 700 having the internal space 702.

Figure 8:
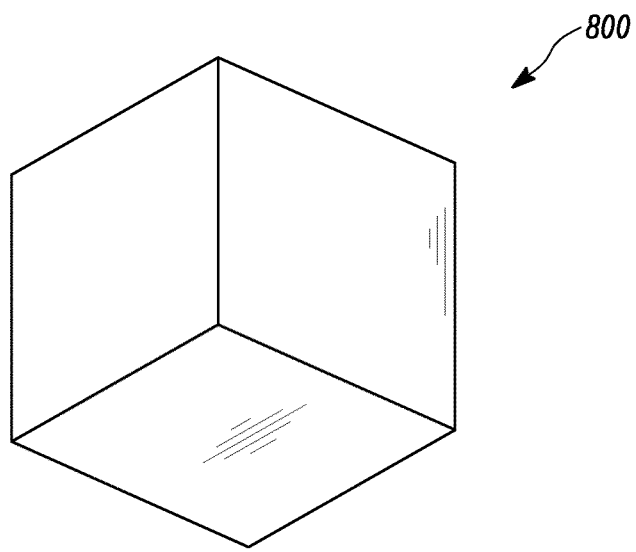
FIG. 8 is a perspective view of a removable form structure, according to one or more embodiments of the present disclosure.

FIG. 8 illustrates a perspective view of a removable form structure 800 for manufacturing a component (shown in FIG. 10), according to one or more embodiments of the present disclosure. In the present embodiment, the removable form structure 800 may be cubical in shape for forming an internal space (shown in FIG. 10) of the component which is cubical in shape. In one embodiment, constructional and operational details of the removable form structure 800 may be similar to the constructional and operational details of the removable form structure 100.

Figure 9:
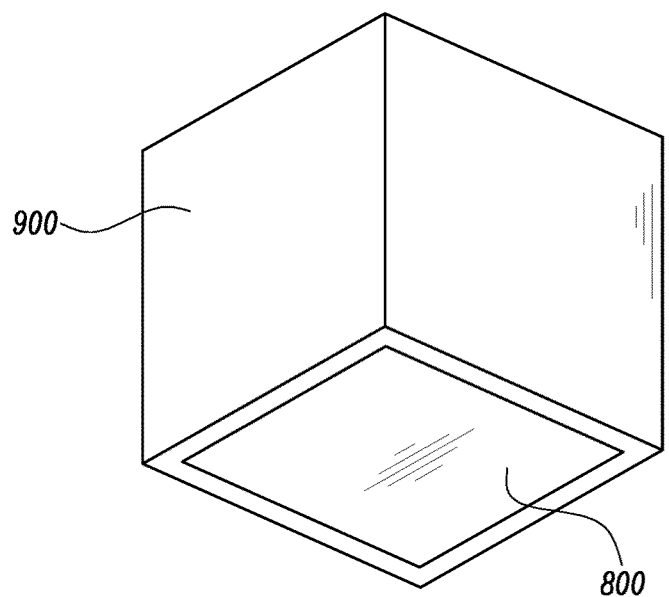
FIG. 9 is a perspective view of the removable form structure with a material deposited by using an additive manufacturing technique, according to one or more embodiments of the present disclosure.

FIG. 9 illustrates a perspective view of the removable form structure 800 with a material 900 deposited by using the additive manufacturing technique, according to one or more embodiments of the present disclosure. In one embodiment, constructional and operational details of the material 900 may be similar to the constructional and operational details of the material 200. Upon solidification of the material 900 deposited on the removable form structure 800, the removable form structure 800 may be removed for manufacturing the component.

Figure 10:
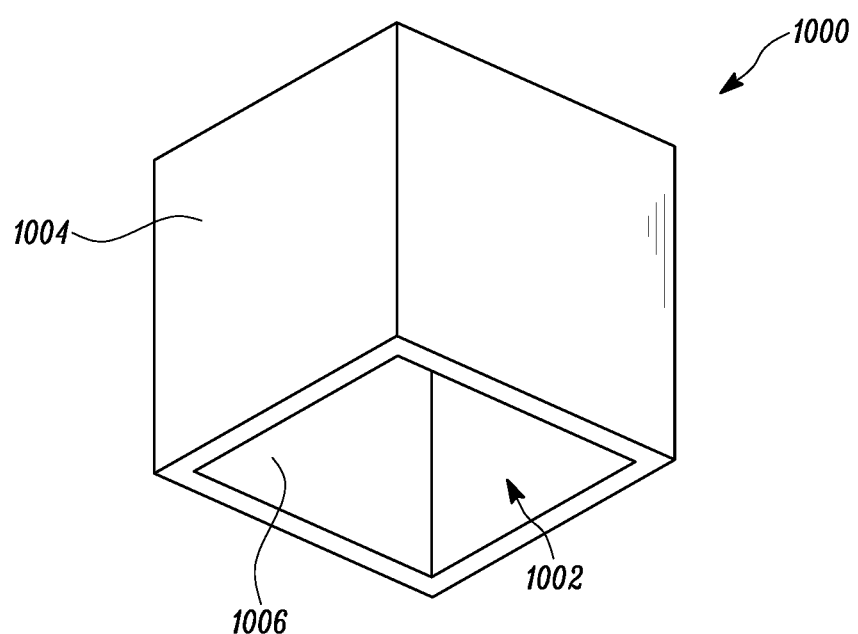
FIG. 10 is a perspective view of a component having an internal space, according to one or more embodiments of the present disclosure.

FIG. 10 illustrates a perspective view of the component 1000 having the internal space 1002, according to one or more embodiments of the present disclosure. As shown, the component 1000 may include an outer surface 1004 and an inner surface 1006 distal to the outer surface 1004. The inner surface 1006 may define the internal space 1002 which may be formed by removal of the removable form structure 800 in contact with the inner surface 1006 before the removal.

In another embodiment, the removable form structure 800 may be removed to form a pre-machined component (not shown) having a pre-machined internal space (not shown) which may then be machined to manufacture the component 1000.

The components 400, 700, and 1000 have the internal spaces 402, 702, and 1002 such that one surface of each of the components 400, 700, and 1000 remains open. For example, as shown in FIG. 4, FIG. 7, and FIG. 10, bottom surfaces of the components 400, 700, and 1000 are open.

Figure 11:
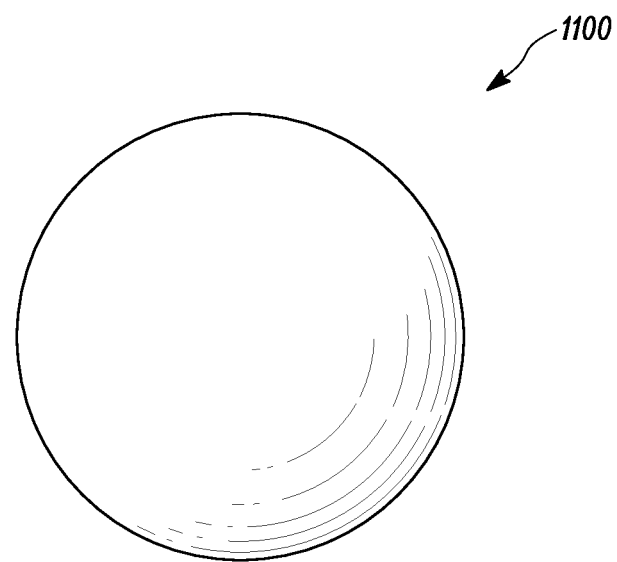
FIG. 11 is a perspective view of a removable form structure, according to one or more embodiments of the present disclosure.

FIG. 11 illustrates a perspective view of a removable form structure 1100 for manufacturing a component (shown in FIG. 13), according to one or more embodiments of the present disclosure. The component may include an internal space (shown in FIG. 13) which may be surrounded by a material (shown in FIG. 12). In the present embodiment, the removable form structure 1100 may be spherical in shape for forming the internal space of the component which is spherical in shape. In one embodiment, constructional and operational details of the removable form structure 1100 may be similar to the constructional and operational details of the removable form structure 100.

Figure 12:
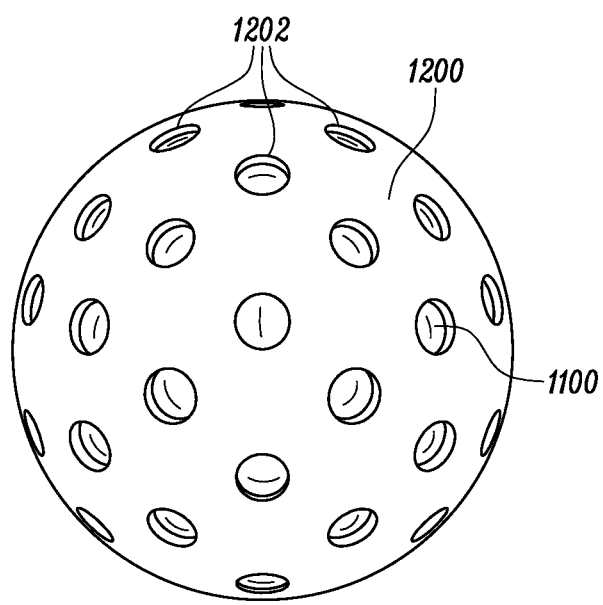
FIG. 12 is a perspective view of the removable form structure with a material deposited by using an additive manufacturing technique, according to one or more embodiments of the present disclosure.

FIG. 12 illustrates a perspective view of the removable form structure 1100 with a material 1200 deposited by using the additive manufacturing technique, according to one or more embodiments of the present disclosure. In one embodiment, constructional and operational details of the material 1200 may be similar to the constructional and operational details of the material 200. The material 1200 may be deposited in such a manner that the material 1200 may cover the removable form structure 1100 on all sides. Upon solidification of the material 1200, the removable form structure 1100 may be removed for manufacturing the component.

In one embodiment, for removing the removable form structure 1100, at least one hole 1202 may be formed in the material 1200 deposited on the removable form structure 1100. The removable form structure 1100 may then be removed by vaporization through the at least one hole 1202.

In one embodiment, a number and dimensions of the at least one hole 1202 may vary based on the component to be manufactured.

Figure 13:
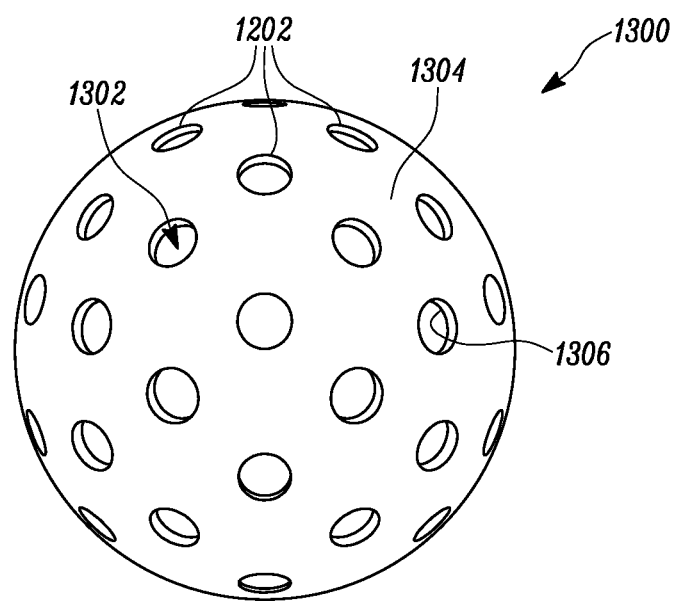
FIG. 13 is a perspective view of a component having an internal space, according to one or more embodiments of the present disclosure.

FIG. 13 illustrates a perspective view of the component 1300 having the internal space 1302, according to one or more embodiments of the present disclosure. As shown, the component 1300 may include an outer surface 1304 and an inner surface 1306 distal to the outer surface 1304. The inner surface 1306 may define the internal space 1302 which may be formed by removal of the removable form structure 1100 in contact with the inner surface 1306 before the removal.

In the present embodiment, the component 1300 includes the at least one hole 1202. In one embodiment, the at least one hole 1202 may be closed after the vaporization of the removable form structure 1100 and therefore, the component 1300 may not include the at least one hole 1202.

In another embodiment, the removable form structure 1100 may be removed to form a pre-machined component (not shown) having a pre-machined internal space (not shown) which may then be machined to manufacture the component 1300.

Referring to FIG. 4, FIG. 7, FIG. 10, and FIG. 13, the component 400, the component 700, the component 1000, and the component 1300 may collectively be referred to as the components 400, 700, 1000, and 1300 in the present disclosure. Similarly, the internal space 402, the internal space 702, the internal space 1002, and the internal space 1302 may collectively be referred to as the internal spaces 402, 702, 1002, and 1302. Further, the removable form structure 100, the removable form structure 500, the removable form structure 800, and the removable form structure 1100 may collectively be referred to as the removable form structures 100, 500, 800, and 1100. Furthermore, the material 200, the material 600, the material 900, and the material 1200 may collectively be referred to as the materials 200, 600, 900, and 1200.

INDUSTRIAL APPLICABILITY

The present disclosure relates to a method 1400 and a method 1500, collectively referred to as methods 1400, 1500, of manufacturing the components 400, 700, 1000, and 1300 according to one or more embodiments of the present disclosure. The methods 1400, 1500 may manufacture the components 400, 700, 1000, and 1300 having the respective internal spaces 402, 702, 1002, and 1302 by using the corresponding removable form structures 100, 500, 800, and 1100. The removable form structures 100, 500, 800, and 1100 may be removed by one of the mechanical removal technique or the vaporization, forming the components 400, 700, 1000, and 1300.

Although the present disclosure is explained with regard to manufacturing of the components 400, 700, 1000, and 1300 by using the methods 1400, 1500, the scope of the present disclosure is not limited to the components 400, 700, 1000, and 1300. In fact, the methods 1400, 1500 may be used for manufacturing any component having the internal space, relating to any industry, without departing from the scope of the present disclosure.

For the sake of clarity, the methods 1400, 1500 are explained with regard to manufacturing of the component 400 having the internal space 402. It should be understood that the methods 1400, 1500 are equally applicable to manufacturing of the component 700, the component 1000, and the component 1300, without departing from the scope of the present disclosure.

Figure 14:
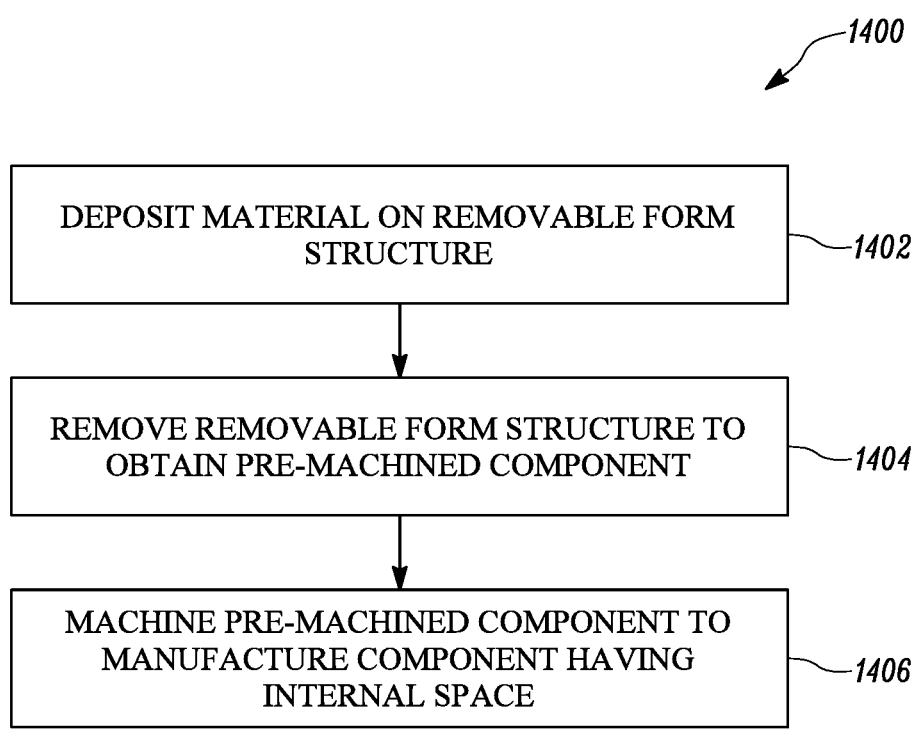
FIG. 14 is a flowchart of a method for manufacturing a component having an internal space, according to one or more embodiments of the present disclosure.

FIG. 14 illustrates a flowchart of the method 1400 for manufacturing the component 400 having the internal space 402, according to one or more embodiments of the present disclosure. For the sake of brevity, features of the present disclosure which are already explained in the description of FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13 are not explained in detail in the description of FIG. 14.

At block 1402, the method 1400 may include depositing the material 200 on the removable form structure 100. The removable form structure 100 may have the geometry corresponding to the geometry of the internal space 402 of the component 400. In one embodiment, the material 200 may be deposited on the removable form structure 100 by the additive manufacturing technique.

At block 1404, upon solidification of the material 200 deposited on the removable form structure 100, the removable form structure 100 may be removed to obtain the pre-machined component 300. At block 1406, the pre-machined component 300 may be machined to manufacture the component 400 having the internal space 402.

Figure 15:
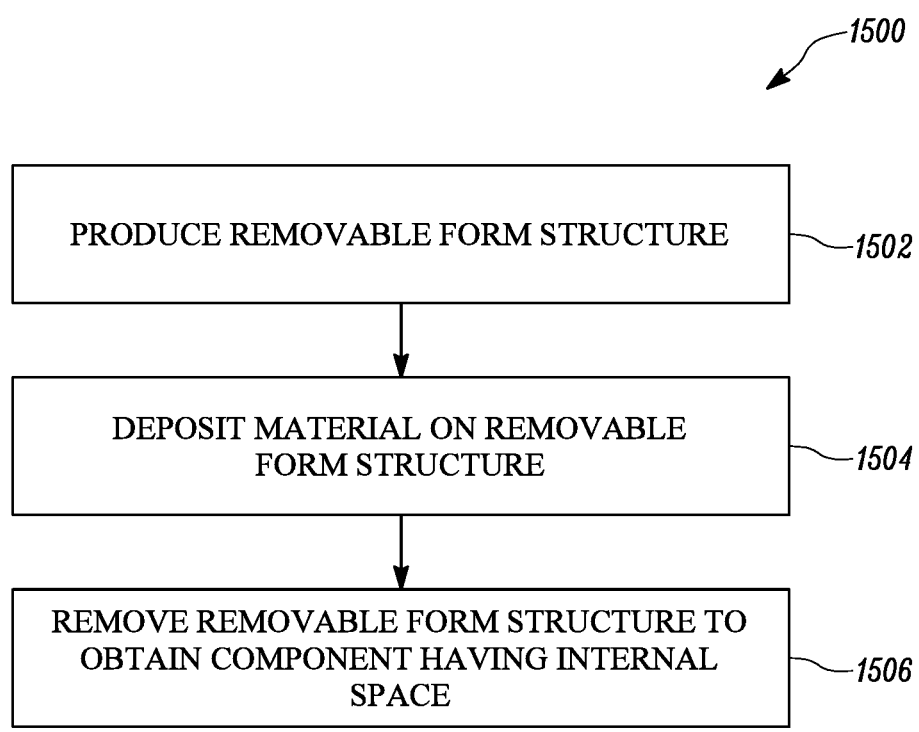
FIG. 15 is a flowchart of a method for manufacturing a component having an internal space, according to one or more embodiments of the present disclosure.

FIG. 15 illustrates a flowchart of the method 1500 for manufacturing the component 400 having the internal space 402, according to one or more embodiments of the present disclosure. For the sake of brevity, features of the present disclosure which are already explained in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 are not explained in detail in the description of FIG. 15.

At block 1502, the method 1500 may include producing the removable form structure 100 with the geometry corresponding to the geometry of the internal space 402. At block 1504, the method 1500 may include depositing the material 200 on the removable form structure 100. In one embodiment, the material 200 may be deposited on the removable form structure 100 by the additive manufacturing technique.

At block 1506, upon solidification of the material 200 deposited on the removable form structure 100, the method 1500 may include removing the removable form structure 100 to obtain the component 400 having the internal space 402.

In one embodiment, the method 1500 may include removing the removable form structure 100 to form the pre-machined component 300. After obtaining the pre-machined component 300, the method 1500 may include machining the pre-machined component 300 to manufacture the component 400 having the internal space 402.

The methods 1400, 1500 of the present disclosure offer a comprehensive approach for manufacturing the components 400, 700, 1000, and 1300 having the internal spaces 402, 702, 1002, and 1302. The methods 1400, 1500 can manufacture the components 400, 700, 1000, and 1300 having the internal spaces 402, 702, 1002, and 1302 which are either open at one end or are entirely surrounded by the materials 200, 600, 900, and 1200. The methods 1400, 1500 are simple and time-efficient as the methods 1400, 1500 do not involve typical material removal processes for forming the internal spaces 402, 702, 1002, and 1302 in the components 400, 700, 1000, and 1300.

Further, the internal spaces 402, 702, 1002, and 1302 can be formed by vaporization or by the mechanical removal technique, providing flexibility to the methods 1400, 1500. Moreover, since the internal spaces 402, 702, 1002, and 1302 are formed by the vaporization or the mechanical removal of the removable form structures 100, 500, 800, and 1100 and not by the typical material removal processes, the methods 1400, 1500 manufacture the components 400, 700, 1000, and 1300 with minimal material wastage. As a result, cost associated with the manufacturing of the components 400, 700, 1000, and 1300 with the internal spaces 402, 702, 1002, and 1302 is also significantly reduced. Therefore, the present disclosure offers the methods 1400, 1500 for manufacturing the components 400, 700, 1000, and 1300 having the corresponding internal spaces 402, 702, 1002, and 1302, that are simple, effective, economical, and flexible.

While aspects of the present disclosure have been particularly shown and described with reference to the implementations above, it will be understood by those skilled in the art that various additional implementations may be contemplated by the modification of the disclosed machines, systems and methods without departing from the spirit and scope of what is disclosed. Such implementations should be understood to fall within the scope of the present disclosure as determined based upon the claims and any equivalents thereof.

What is claimed is:

1. A method of manufacturing a component, the method comprising:
   depositing a material on a removable form structure having geometry corresponding to an entirety of an internal space of a pre-machined form of the component such that the deposited material surrounds an outside of the removable form structure, wherein the material is deposited on the removable form structure by an additive manufacturing technique;
   removing all of the removable form structure and leaving the deposited material to obtain the pre-machined component; and
   machining the pre-machined component to manufacture the component having the internal space,
   wherein the removable form structure is one of a graphite form structure, a carbon form structure, a ceramic form structure, and a tungsten form structure, and
   wherein the material deposited on the removable form structure is a super-alloy.

2. The method of claim 1, further comprising producing the removable form structure with the geometry corresponding to the internal space.

3. The method of claim 1, wherein the additive manufacturing technique is a laser cladding process.

4. The method of claim 1, wherein the removable form structure is mechanically removed to obtain the pre-machined component.

5. The method of claim 1, wherein the removable form structure is vaporized to obtain the pre-machined component.

6. The method of claim 1, wherein the component is a pre-chamber of a fuel injector.

7. A method of manufacturing a component, the method comprising:
   producing a removable form structure with geometry corresponding to an entirety of an internal space of a pre-machined form of the component;
   depositing a material on the removable form structure such that the deposited material surrounds an outside of the removable form structure, wherein the material is deposited by an additive manufacturing technique; and
   removing all of the removable form structure and leaving the deposited material to obtain the component having the internal space,
   wherein the removable form structure is one of a graphite form structure, a carbon form structure, a ceramic form structure, and a tungsten form structure, and wherein the material formed on the removable form structure is a super-alloy.

8. The method of claim 7, further comprising:
removing all of the removable form structure to obtain the pre-machined component; and
machining the pre-machined component to manufacture the component having the internal space.

9. The method of claim 7, wherein the material is deposited on the removable form structure by a laser cladding process.

10. The method of claim 7, wherein the removable form structure is mechanically removed to obtain the component having the internal space.

11. The method of claim 7, wherein the removable form structure is vaporized to obtain the component having the internal space.

12. The method of claim 7, wherein the component is a pre-chamber of a fuel injector.

\* \* \* \* \*